R. STILES.
Horse-Powers.

No. 158,329. Patented Dec. 29, 1874.

WITNESSES:
Chas N Vida
A. F. Terry

INVENTOR:
R. Stiles
BY
ATTORNEYS.

UNITED STATES PATENT OFFICE

REUBEN STILES, OF EAST TROY, PENNSYLVANIA.

IMPROVEMENT IN HORSE-POWERS.

Specification forming part of Letters Patent No. 158,329, dated December 29, 1874; application filed November 7, 1874.

*To all whom it may concern:*

Figure 1:
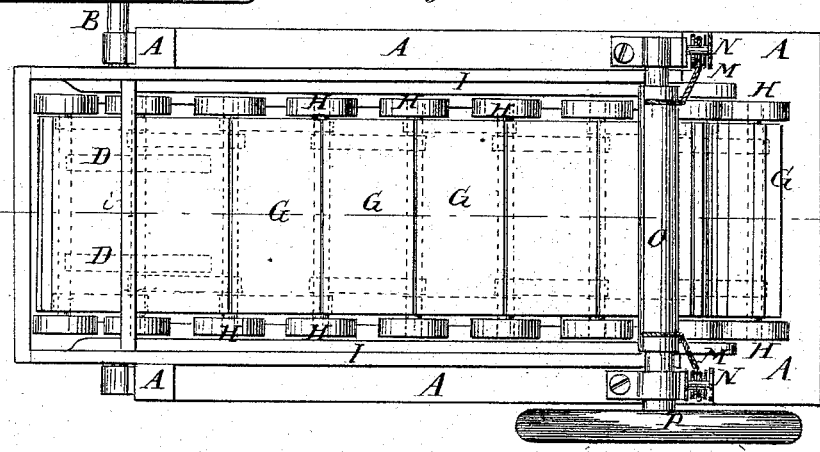
Figure 2:
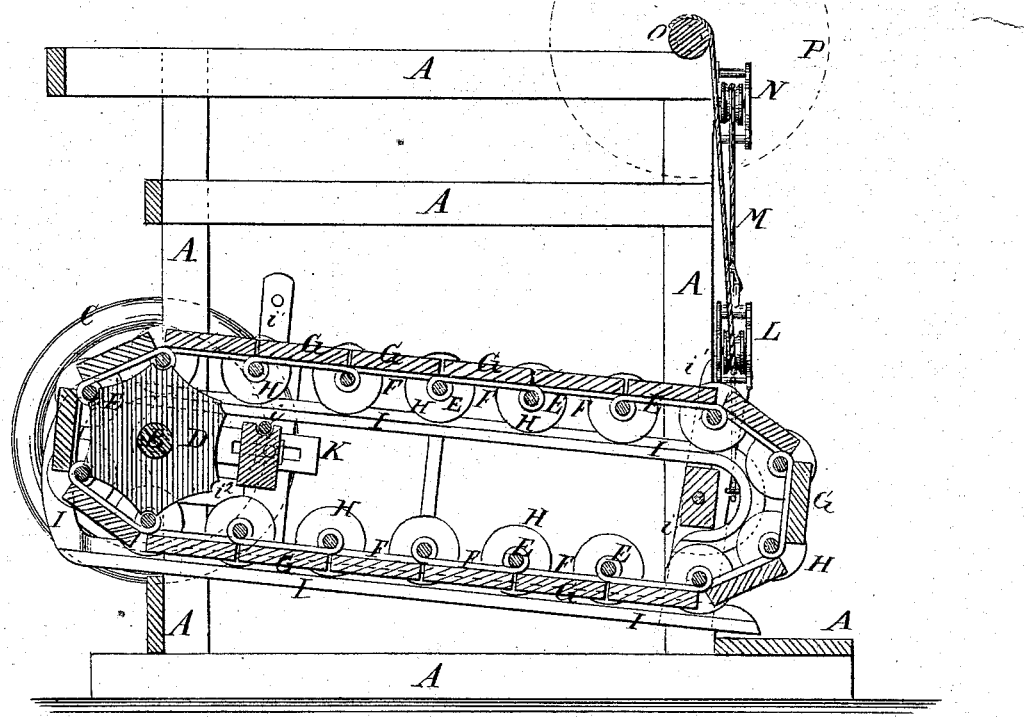
Figure 3:
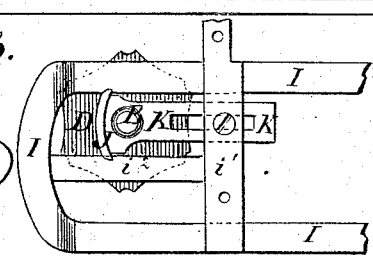

Be it known that I, REUBEN STILES, of East Troy, in the county of Bradford and State of Pennsylvania, have invented a new and useful Improvement in Horse-Power, of which the following is a specification:

Figure 1 is a top view of my improved power. Fig. 2 is a vertical longitudinal section of the same, taken through the line $xx$, Fig. 1. Fig. 3 is a detail side view of the forward part of the track-frame, showing the device for tightening the endless chain.

Similar letters of reference indicate corresponding parts.

My invention has for its object to furnish an improved horse-power for operating a churn, and for other purposes, which shall be so constructed that its rear end may be conveniently raised and lowered to give the endless chain any required inclination, and that the endless chain may be conveniently tightened or slackened, as may be desired.

The invention will first be fully described, and then pointed out in the claim.

A is the frame of the machine, to the front parts of which, at a suitable distance from their lower ends, are attached bearings in which the shaft B revolves. To one end of the shaft B is attached the crank-wheel C, from which motion is given to the machinery to be driven, and which is made heavy, to adapt it to serve as a fly-wheel. To the middle part of the shaft B, at a suitable distance apart, are attached two wheels, D, the rims of which are notched to receive the rods E, which are connected to each other by straps F to form an endless chain, and to which are attached the cross-bars or planks G, upon which the horse or other animal walks, to give motion to the machine. Upon the ends of the rods E are placed small wheels H, which roll along the flanges of the side bars of the track-frame I. The track-frame I is made with straight and parallel top and bottom side bars and with semicircular ends. The flanges of the lower side bars are straight, and terminate at the beginning of the curve of the ends of said track-frame. The forward ends of the flanges of the upper side-bars of the track-frame terminate at the beginning of the curve of the forward end of the said track-frame, and their rear ends are curved upon a shorter curve than said end of the track-frame, so as to overlap the ends of the lower flanges, and be at such a distance above said lower flanges that the wheels H may pass between them, and thus readily pass up from the lower to the upper flanges. At the forward end of the track-frame I the wheels H are carried from the upper to the lower flanges by the wheels D. The two track-frames I are held together by cross or tie rods $i$, and are held apart by shoulders or collars formed upon said tie-rods, or by blocks interposed between the said frames I. From the front cross-bars $i^1$ to the forward ends of the frames I extend short longitudinal bars $i^2$, between which and the upper side bars of the frame I slide bearings J, through which the shaft B passes, so that the forward end of the said frame I may hang upon the said shaft B. To the bearings J are attached, or upon them are formed, bars K, which project across and are bolted to the cross-bars $i^1$. Slots are formed through the bars or arms K to receive the said bolts, so that the bearings J may be conveniently adjusted to tighten or slacken the endless chain. To the rear ends of the track-frames I are attached pulley-blocks L, to which are attached the ends of the ropes M. The ropes M pass around the pulleys of the blocks L and around the pulleys of the blocks N, attached to the upper part of the rear end of the frame A. The other ends of the ropes M are attached to the shaft O that revolves in bearings attached to the top of the frame A, so that the rear end of the track-frames I may be raised and lowered to adjust the inclination of the track by turning the shaft O to wind up and unwind the ropes M.

The shaft O may be turned by a hand-wheel, P, attached to one of its ends, or by other convenient means, and may be held in position, when adjusted, by pawls and ratchet-wheels, or other suitable means.

This construction makes the inclination of the endless chain to be conveniently adjusted according to the weight of the animal that is to operate the machine.

Having thus described my invention, I claim as new and desire to secure by Letters Patent—

The combination, with track-frame I, having bars $i^1$ $i^2$ at right angles to each other, of slide-bearings J and slotted bar K, adjustable on a screw-bolt passing through bar $i^1$, as and for the purpose specified.

REUBEN STILES.

Witnesses:
J. H. DEXTER,
D. N. ALLEN.